Figure 1:
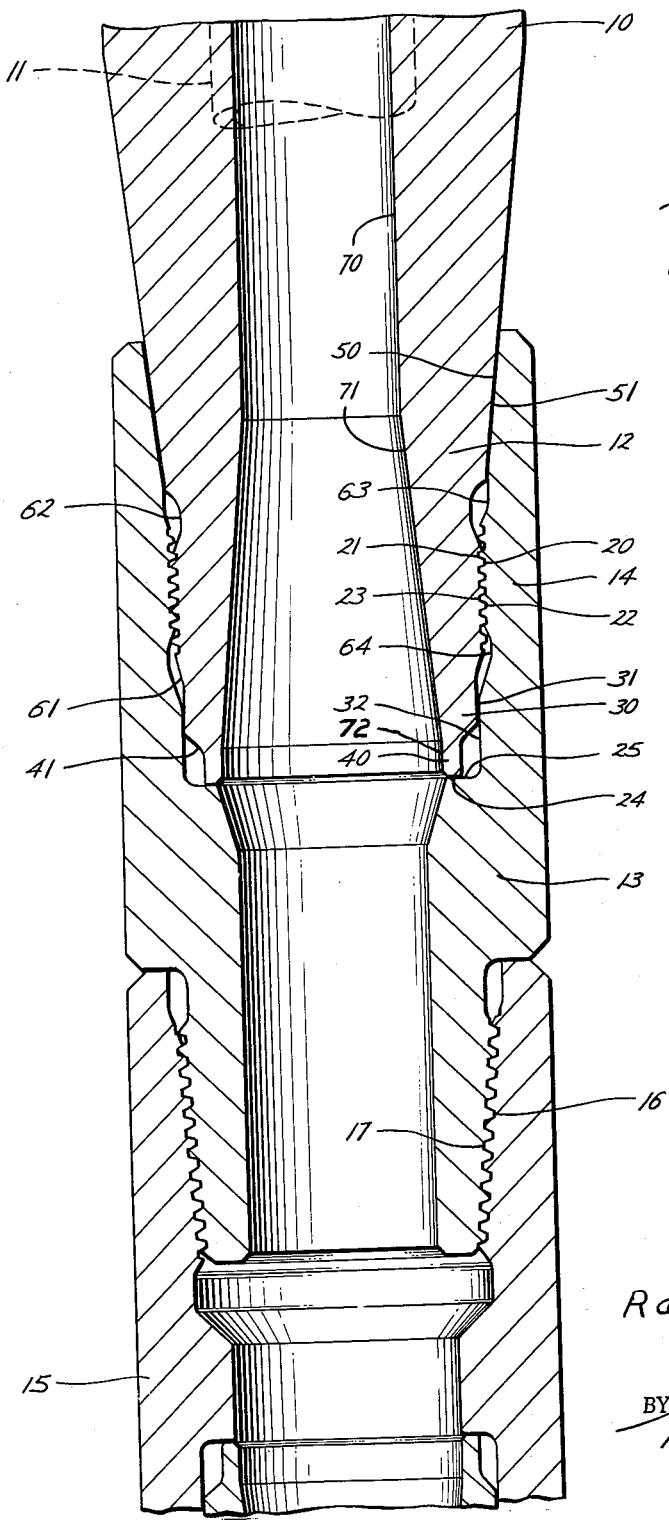

Ralph E. Nay
INVENTOR.

BY Murray Robinson
ATTORNEY

United States Patent Office 2,992,021
Patented July 11, 1961

2,992,021
PIPE CONNECTION
Ralph E. Nay, Oklahoma City, Okla., assignor to American Iron & Machine Works Company, Inc., Oklahoma City, Okla., a corporation of Delaware
Filed Feb. 26, 1958, Ser. No. 717,593
3 Claims. (Cl. 285—334)

This invention pertains to pipe connections and more particularly to shrink fitted threaded connections between drill collars and drill collar connectors used especially in drilling oil wells and the like.

It is already known to connect a drill collar to a drill collar connector by means of untapered threads sealed from fluids outside by means of a tapered land at the mouth of the connector box engaging a tapered land on the drill collar pin and sealed from fluids inside by means of a cylindrical nose on the end of the drill collar pin engaging a cylindrical socket in the connector box, the nose engaging the socket both at the sides and the end, the whole connection being shrink fitted both radially and axially. See for example United States Patent Number 2,825,585 issued March 4, 1954 entitled "Prestressed Shrunk-Fitted Rotary Drill Collar and Tool Joint."

According to the present invention a connection of the aforesaid known type is modified in that the nose on the pin end of the drill collar is reduced in outer diameter and thickness over a portion of its length adjacent the extremity thereof the length of the reduced portion being greater than its thickness so as to produce a flexible stem at the extremity thereof whose sides do not engage the sides of the socket of the connector box. The portion of the connector between the threads and the socket is reduced in thickness to provide a maximum inner diameter at this portion greater than the thread root diameter, the reduction in thickness being gradual so that there are slowly tapering portions adjacent the central part of maximum inner diameter. The portion of the connecter between the threads and the tapered land is made cylindrical opposite a portion of the drill collar between the threads and tapered land thereof which is of smaller outer diameter than the thread root diameter and the adjacent areas of gradual taper. The taper of the outer lands is gradual enough to be a seizing taper for steel, which is the material of which the drill collar and connector are made.

The objects and advantages of the new construction are elimination of the possibility of failures of the connection. This is very important, for even a single failure can be very costly to the operator drilling a deep hole. A connection of this type must be perfect.

Other objects and advantages of the invention will become apparent from the following description of a preferred embodiment thereof, reference being made to the accompanying drawing wherein:

FIGURE 1 is an axial section through a connection embodying the invention.

Referring to FIGURE 1, there is shown one end of a drill collar 10. To give the drawing a relative scale the dotted line 11 indicates the thickness of an ordinary drill pipe compared to the drill collar shown. The drill collar is provided with a pin on each end. Only one such pin end 12 of the drill collar is shown in the drawing, it being understood that there is a like pin on the other end of the drill collar.

Each drill collar pin is adapted to engage with a drill collar connector such as 13, the pin engaging within the box 14 of the connector. The drill collar will be connected to a male drill collar connector on one end and a female drill collar connector on the other end, so that connector at one end of the drill collar can be made up with an opposite type connector on the end of another connector. For example the connector 13 is a male connector and is shown made up with a female connector 15 which is to be connected to another drill collar. The male and female portions of the connectors are provided with any desired type of tool joint threads, e.g. conventional A.P.I. threads as shown at 16, 17. It will be understood that the female connectors such as 15 will each be provided with a box end portion constructed the same as box 14 of the male connector, for engagement with the pin end of a drill collar. Thus, between each drill collar end and connector there will be a connection the same as between pin 12 and box 14, and it is to such connection and to drill collars and connectors adapted thereto that the invention relates particularly.

The connection includes general cylindrical areas 20, 21, on the pin and box, provided with threads 22, 23. The unstressed diameters of the threads when at the same temperature is such that the crest diameter of the pin thread 23 is greater than root diameter of box thread 22 so that it is necessary to heat the box in order to engage the threads. Although the threads have the same pitch, there is sufficient flank clearance to permit the full length of the threads to be made up without interference even when the box is at a higher temperature than the pin. Details of such shrink fitted threads are shown in United States Patent No. 2,636,753 entitled, "Tool Joint-Pipe Connection" issued April 28, 1953. It will be understood however that other types of shrink fitted threads may also be employed. The threads must be formed so as to be engageable when the box member of the pin and box connection is at a higher temperature than the pin, and to engage with radial and circumferential compression of the pin and radial compression and circumferential tension of the box when the members are at the same temperature. In addition, as described in said patent, flank stresses are produced on the threads both by the radial shrink fit and due to the pin being in axial compression and the box in axial tenson due to the connection being made up while the box is hot to the point where the end face 24 of the pin engages the bottom 25 of the box, the surfaces 24, 25 being perpendicular to the axis of the connection.

The pin has a nose 30 whose outer surface 31 is cylindrical and of smaller diameter than the crest diameter of the box thread. The nose engages a socket in the box having a cylindrical surface 32 of smaller cold unstressed diameter than surface 31 of the nose, the socket being adapted to expand to a large enough diameter to receive the nose when the box is heated to the same temperature as is required for make up of threads 22, 23. Thus when the connection has been made up and is all at the same temperature, the socket 32 is in tight shrink fit engagement with the nose.

The cylindrical surfaces or lands 31, 32 are smooth finished surfaces so that they seal when shrink fitted together. The same is true of the pin end surface 24 and the bottom 25 of the socket. There is thus provided a double seal on the inside of the connection protecting the threads 22, 23 from the fluids flowing through the connection.

An important feature of the subject invention is the stem 40. This is a portion at the extreme end of the pin 12 beyond the nose 30 thereof. The stem is of smaller outer diameter than the nose 30 and is thereby spaced from the inner surface 32 of the socket in the connector box. The stem joins the nose in a steeply tapered portion 41. The outer diameter of the stem is small enough so as to leave a wall thickness smaller than the length of the stem resulting in considerable flexibility. The provision of this stem, along with other features of the invention, has completely eliminated failures of the connection.

At the mouth of the connector box is a conical or tapered land 50 adapted to shrink fit onto conical or tapered land 51 on the drill collar pin. These outer lands are smooth finished so as to seal when engaged and thus protect the threads 22, 23 from fluids outside the connection. The taper angle of the outer lands is small enough to cause the conical lands to seize. For example for steel drill collars and connectors a taper of 3 inches in diameter per axial foot is suitable. The seizing taper of the outer lands is another very important feature of the invention contributing to the complete elimination of failures therein.

Very gradual run out or vanishing of threads 22, 23, is provided. On the pin, the thread run out merges at one end with tapered portion 61 that merges with nose 30; the pin thread run out at the other end merges with a cylindrical portion 62 that has large radius fillets at each end. The portion 62 is cold rolled. In this regard the subject construction is similar to that shown in the above-mentioned Patent Number 2,852,585. However, opposite cylindrical portion 62 is a cylindrical portion 63 on the connector box, disposed between tapered land 50 and the run out of thread 23. The drawing shows that cylindrical portion 63 extends somewhat above the upper end of cylindrical portion 62, spanning the lower edge of pin land 51, while cylindrical portion 62 extends somewhat below the lower end of cylindrical portion 63 opposite the run out of box thread 23. And at the other end of thread 23 of the box opposite the run out of thread 22 is a cylindrical portion 64 which is of greater inside diameter than the box thread root and merges by means of large radius fillets with the run out of box thread 23 and with surface 32 of the socket. The provision of the undercut cylindrical surfaces 63, 64, on the connector box are a third important feature of the invention contributing to the complete elimination of failures of the connection.

It will be noted that the bore 70 of the drill collar terminates in a flaring portion 71 having a taper of the order of 1" to 3" per foot measured on diameters, the precise taper depending on the size of bore 70 and the outer diameter of the drill collar as required to meet the particular requirements of individual bore hole operations. The extremity of the interior of the drill collar is cylindrical over the portion corresponding to the stem, as shown at 72.

While a preferred embodiment of the invention has been shown and described, many modifications thereof can be made by one skilled in the art without departing from the spirit of the invention and it is desired to protect by Letters Patent all forms of the invention falling within the scope of the following claims.

1. A pipe connection comprising a drill collar connector box radially and axially shrink fitted to a drill collar pin,
said box having successively on its interior surface starting from the mouth of the box
a conically tapered land,
a cylindrical surface of a diameter equal to the minimum diameter of said land,
a generally cylindrical portion having a screw thread whose root diameter is smaller than that of said cylindrical surface,
a cylindrical area whose diameter is larger than said root diameter,
said cylindrical area having a diameter substantially the same as that of said cylindrical surface, and
a cylindrical socket of smaller diameter than the crest diameter of said thread,
said cylindrical area being connected to said socket and threaded portion by fillets,
the bottom of said socket being perpendicular to the axis of said box,
said pin having successively on its exterior surface
a land having a seizing conical taper engaged with that of said box and having a maximum diameter as large as the outer diameter of said box,
a cylindrical surface of smaller diameter than that of said pin land opposite said cylindrical surface of said box,
a generally cylindrical portion having a screw thread engaged with said box thread and whose root diameter is larger than that of said cylindrical surface of the pin,
said cylindrical surface on the pin being connected to said pin land and pin threaded portion by fillets,
a cylindrical nose engaged with the box socket and whose diameter is smaller than that of said pin thread root, and
a cylindrical stem radially spaced from said socket and having a length greater than the thickness of the stem,
said stem being connected to said nose by a tapered portion,
the end of said stem being perpendicular to the axis of the pin and in engagement with the bottom of the socket,
said lands, nose, socket bottom and stem end and the sides of the socket being smooth finished to seal when said box is shrink fitted to said pin,
said lands, threads, nose, stem and socket being shrink fitted together placing said pin in radial and circumferential compression and the box in radial compression and circumferential tension and the nose and stem in axial compression and the socket in axial tension.

2. In combination, a drill collar and a drill collar connector, said drill collar having a pin and said connector having a box shrink fitted onto said pin,
said box having successively on its interior surface starting from the mouth of the connector
a conically tapered land,
a generally cylindrical portion having a screw thread whose root diameter is smaller than the minimum diameter of said land, and
a cylindrical socket of smaller diameter than the crest diameter of said thread,
said box being characterized by having
a portion disposed between said land and said threaded portion and outwardly relieved from the conical surface defined by continuing the tapered surface of said land toward said threaded portion, and
a shallow groove with sloping side walls disposed between said threaded portion and said socket and having a depth below the surface defined by the root diameter of said thread less than the height of said thread above the last said surface,
said pin having successively on its exterior surface
a conically tapered land engaged with said box land,
a generally cylindrical portion having a screw thread engaged with said box thread,
a cylindrical nose engaged with the box socket and whose diameter is smaller than that of the root of said pin thread, and
disposed between said pin thread and pin land a shallow groove with sloping side walls and having a depth below the surface defined by the root diameter of said pin thread less than the height of said pin thread above the last said surface,
said pin being characterized by
said pin land having a seizing taper and having a maximum diameter as large as the outer diameter of said box, and said pin being further characterized by having a cylindrical stem having a length greater than its thickness extending axially from the end of said nose and and having an end perpendicular to the axis of the stem engaging the correlative bottom of the socket,
said stem having a smaller diameter than said nose and being radially spaced from said socket and being connected to said nose by a transition portion flaring in diameter from said stem to said nose, said lands, nose, socket bottom and stem end and the sides of said socket being smooth finished to seal when said box is shrink fitted to said pin, said shrink fit of said box and pin placing said pin in radial and circumferential compression and the box in radial compression and circumferential tension and the nose and stem in axial compression and the socket in axial tension.

3. The combination of claim 2 wherein the portion of the box that is disposed between the box land and threaded portion of the box and outwardly relieved from the conical surface defined by continuing the tapered surface of said land toward said threaded portion commences nearer the mouth of the connector than the smallest diameter part of the conically tapered land on the pin, the thread on the box extends closer to said mouth than the thread on the pin and terminates opposite the shallow groove in the pin, the thread on the pin extends closer to the end of the pin than the box thread and terminates opposite the shallow groove in the box, and said threads vanish gradually at each end.

References Cited in the file of this patent

UNITED STATES PATENTS

| | | |
|---|---|---|
| 411,125 | Kleman | Sept. 17, 1889 |
| 1,407,335 | Reynolds | Feb. 21, 1922 |
| 1,517,428 | Janraus | Dec. 2, 1924 |
| 2,443,312 | Geiger et al. | June 15, 1948 |
| 2,450,453 | Boehm | Oct. 5, 1948 |
| 2,511,889 | Weiss | June 20, 1950 |
| 2,636,753 | Griffin | Apr. 28, 1953 |
| 2,671,949 | Welton | Mar. 16, 1954 |
| 2,746,486 | Gratzmuller | May 22, 1956 |
| 2,825,585 | Griffin | May 4, 1958 |